United States Patent

Shiro et al.

[11] Patent Number: 5,259,950
[45] Date of Patent: Nov. 9, 1993

[54] COMPOSITE MEMBRANE

[75] Inventors: Kuniyasu Shiro, Kyoto; Yoshio Himeshima, Otsu; Shinichi Yamada, Otsu; Tetsuo Watanabe, Otsu; Tadahiro Uemura, Kyoto; Masaru Kurihara, Otsu, all of Japan

[73] Assignee: Toray Industries, Inc., Japan

[21] Appl. No.: 776,267

[22] PCT Filed: Jan. 31, 1991

[86] PCT No.: PCT/JP91/00118
§ 371 Date: Jan. 21, 1992
§ 102(e) Date: Jan. 21, 1992

[87] PCT Pub. No.: WO91/14499
PCT Pub. Date: Oct. 3, 1991

[30] Foreign Application Priority Data

Mar. 27, 1990 [JP] Japan .................................. 2-79936
Mar. 28, 1990 [JP] Japan .................................. 2-80176

[51] Int. Cl.$^5$ .............................................. B01D 67/00
[52] U.S. Cl. ................................ 210/490; 210/500.28
[58] Field of Search .................... 210/500.28, 500.23, 210/500.27, 490

[56] References Cited

U.S. PATENT DOCUMENTS 5,112,487  5/1992  Himeshima et al. ........... 210/500.28

Primary Examiner—Frank Sever
Attorney, Agent, or Firm—Austin R. Miller

[57] ABSTRACT

A composite membrane excelling in organic solvent resistance, heat resistance and organic vapor resistance is disclosed. The composite membrane of the present invention comprises a porous membrane including as a major constituent a polymer having a repeating unit represented by the formula (I)

$$-(-Ph-S-Ph-SO_2-)_{n}  \quad (I)$$

(wherein Ph represents phenyl group, n represents a natural number) and an active layer formed on said porous membrane. The composite membrane of the present invention may be used as a composite membrane for pervaporation, gas separation membrane and as a reverse osmosis membrane.

11 Claims, No Drawings

COMPOSITE MEMBRANE

TECHNICAL FIELD

The present invention relates to a composite membrane to be used for pervaporation method, which membrane is excellent in solvent resistance, to a composite membrane useful for selective separation of liquid mixtures, especially for the separation of aqueous solutions containing organic solvents or aqueous solutions at high temperatures, and to a composite membrane which may be used for selective separation of mixed gas, which has high gas permeability, high separation ability and high resistance to organic vapors.

BACKGROUND ART

Pervaporation method is a useful method for separating organic liquid mixtures containing volatile components by utilizing a membrane. By this method, separation of liquid mixtures of organic components which are difficult to separate by distillation because the boiling points thereof are close, because the mixture is an azeotrope, or because the organic components are denatured by heating, can be attained. This separation method has an advantage in that the energy cost is lower than separation by distillation or the like. Recently, intensive studies of this method were made especially for the separation of alcohol/water mixtures. A membrane by which water can be removed from a high concentration aqueous alcohol solution is now practically used.

In this method, an organic liquid mixture containing a volatile component is supplied to one side of a membrane and the pressure of the other side of the membrane (secondary side) is reduced with or without flowing an inert gas. By so doing, a component in the mixture having a high affinity with the polymer constituting the membrane preferentially permeates the membrane to the secondary side in gaseous form, and separation is performed. For example, in the case of aqueous ethanol solution, if the membrane has a high affinity for ethanol, ethanol preferentially permeates the membrane, and if the membrane has a high affinity for water, water preferentially permeates the membrane.

Designating the component which preferentially permeates as Component A, and designating the other component as Component B, the performance of a pervaporation method is expressed by the separation coefficient $\alpha$ defined as follows and by the permeation rate Q.

$$\alpha = (PA/PB)/(FA/FB)$$

In this equation, PA represents the concentration by weight of Component A in the secondary side, PB represents the concentration by weight of Component B in the secondary side, FA represents the concentration by weight of Component A in the supplying side, and FB represents the concentration by weight of Component B in the supplying side. Q means the amount of the permeated component per unit area of the membrane per unit time, and the unit is usually $kg/m^2 \cdot hr$.

In the membrane used for the pervaporation method, the thickness of the membrane largely influences the membrane performance, especially the permeation rate. That is, the thinner the membrane, the higher the permeation rate. In order to attain a membrane performance which may be practically employed, it is necessary to make the thickness of the membrane several $\mu m$ or less. However, it is difficult to produce such a thin membrane. Further, even if such a thin membrane can be produced, it cannot be used in practice because the mechanical strength is poor. To solve this problem, a support may be used. Thus, composite membranes comprising an active layer having the substantial separation ability by pervaporation and a support layer for mechanically reinforcing the active layer are now investigated. Such composite membranes are usually produced by first providing a porous support and then applying the active layer on the surface of the support by coating or the like.

Various membranes for pervaporation have been proposed. For example, Japanese Laid-open Patent Application (Kokai) No. 58-89911 discloses a composite membrane employing polyorganosiloxane as the active layer and polyfluorovinylidene or fluorovinylidene copolymer as the support. Japanese Laid-open patent application (Kokai) No. 60-28803 discloses a composite membrane having an active layer made of a polyethyleneimine modified by a water-soluble polymer having a dissociative acidic group, and a support made of porous polysulfone, polyfluorovinylidene, polyfluoroethylene or polyvinylchloride. Japanese Laid-open patent application (Kokai) No. 60-7801 discloses a composite membrane having an active layer made of 1-monoalkyldimethylsilylpropylene polymer and a support made of porous substituted polyacetylene, polysulfone or polypropylene. Japanese Laid-open patent application (Kokai) No. 59-55304 discloses a composite membrane having an active layer made of a reaction product of polyethyleneimine and an acid chloride, and a support made of a porous polysulfone. Japanese Laid-open patent application (Kokai) No. 59-109204 discloses a composite membrane employing polyvinyl alcohol as the active layer and porous polyacrylonitrile as the support.

The present inventors actually examined these conventional composite membranes for pervaporation method for their performance of separating a liquid mixture containing an organic solvent at a high concentration. As a result, the separation coefficients of the composite membranes other than the membrane having a porous polypropylene as the support were about 1, so that substantially no separation was observed with these membranes. It is assumed that this is because the active layer was broken due to the deformation or breaking of the support. As for the composite membrane having porous polypropylene as the support, although it excels in resistance to organic solvents, the membrane performance is very low. Thus, the conventional composite membranes for pervaporation have poor organic solvent resistance or have poor membrane performance, so that they cannot be used in practice for the separation of liquid mixtures containing organic liquid at high concentration.

As a separation membrane with reverse osmotic property used for the selective separation of liquid mixtures, asymmetric cellulose acetate membrane is industrially used. However, this asymmetric membrane has problems with hydrolysis resistance, microorganism resistance, chemical resistance, heat resistance and the like. Thus, although the membrane is practically used in some areas, it cannot be used in a wide variety of areas. New materials which eliminate the drawbacks in the cellulose acetate membrane are now actively investigated mainly in the U.S. and in Japan. Such newly proposed materials include aromatic polyamides, polyamide hydrazides (U.S. Pat. No. 3,567,632), polyamide acids (Japanese laid-open patent application (Kokai) No. 55-37282), cross-linked polyamide acids (Japanese patent publication (Kokoku) No. 56-3769), polyimidazopyrrolones, polysulfoneamides, polybenzimidazoles, polybenzimidazolones, polyaryleneoxides and the like. However, although some materials which overcome some of the drawbacks of cellulose acetate membrane have been obtained, they are inferior to the cellulose acetate membrane in the selective separation ability and permeability.

On the other hand, composite membranes having a porous membrane coated with an active layer controlling the membrane performance are developed. In the composite membranes, the best materials for the active layer and for the porous support can be independently selected, so that the freedom of membrane formation is enlarged. Further, unlike the asymmetric membranes which must be stored in wetted condition, the composite membranes can be stored in dry state. Examples of the composite membranes are described in Japanese laid-open patent application (Kokai) No. 49-133282, Japanese patent publication (Kokoku) No. 55-38164, PB Report 80-182090, Japanese patent publication (Kokoku) No. 59-27202, Japanese laid-open patent application (Kokai) No. 56-40403, U.S. Pat. Nos. 3,744,642, 3,926,798 and 4,277,344, Japanese laid open patent application (Kokai) No. 55-147106, Japanese laid-open patent application (Kokai) No. 58-24303, Japanese laid-open patent application (Kokai) No. 61-42302 and Japanese laid open patent application (Kokai) No. 55-147106.

Among these composite membranes, those having a polysulfone porous membrane and a cross-linked polyamide active layer formed on the porous membrane constitute the main stream of the composite membranes, and these are drawing attention as reverse osmosis membranes with high permeability and high selective separation ability. However, since the polysulfone support membrane employed as the porous membrane has poor heat resistance and solvent resistance, the selective separation performance is degraded if the membrane is used for the separation of an aqueous solution containing an organic solvent or for the separation of aqueous solutions at a high temperature.

There are a number of properties which a practical reverse osmosis membrane should have, such as high permeability and high selective separation ability, as well as high heat resistance and high chemical resistance. However, no membranes have been provided which simultaneously satisfy the high heat resistance and high chemical resistance. Thus, although there are membranes which can exhibit their separation ability for the separation of aqueous solutions containing organic solvents in low concentrations, if these membranes are used for the separation of an aqueous solution containing an organic solvent at a high concentration, the membrane itself or the support membrane is swelled or dissolved by the organic solvent so that the separation performance is degraded. Thus, the use of the composite membranes are limited.

On the other hand, as for the separation membrane used for the selective separation of gas mixtures, it is necessary that the membrane have a high gas permeability and high separation ability. To attain this, it is necessary that the membrane employ the composite form having an active layer formed on a porous membrane.

As such composite membranes, composite membrane having an active layer made of a silicone-based material and a porous substrate membrane made of polysulfone, polyether sulfone and cellulose acetate are known (Japanese laid-open patent application (Kokai) No. 59-120207).

However, with such a conventional composite membrane, since the resistance to organic vapor of the porous membrane is low, if the gas mixture to be separated contains vapor of a polar solvent such as toluene vapor or trichloroethylene vapor, the composite membrane is broken.

DISCLOSURE OF THE INVENTION

The object of the present invention is to provide a composite membrane with high solvent resistance, heat resistance and high resistance to organic vapor, which exhibits good separation performance. More particularly, the object of the present invention is to provide a composite membrane for pervaporation, which has excellent solvent resistance, a reverse osmosis membrane which exhibits high selective separation ability and high water permeability, which has a high heat resistance and solvent resistance, and a composite membrane for gas separation having a high gas permeability and gas separation ability as well as high resistance to organic vapor.

The present inventors intensively studied to find that a composite membrane comprising a porous membrane made of a specific copolymer containing phenylenesulfide units and an active layer formed on the porous membrane exhibits high selective separation ability and has high permeability and excellent solvent resistance to complete the present invention.

That is, the present invention provides a composite membrane comprising a porous membrane including as a major constituent a polymer having a repeating unit represented by the formula (I)

$$\mathrm{+Ph-S-Ph-SO_2+_n} \qquad (I)$$

(wherein Ph represents phenyl group, n represents a natural number) and an active layer formed on said porous membrane.

By the present invention, a composite membrane with high solvent resistance, heat resistance and high resistance to organic vapor, which exhibits good separation performance was provided. More particularly, by the present invention, a composite membrane for pervaporation, which has excellent solvent resistance, a reverse osmosis membrane which exhibits high selective separation ability and high water permeability, which has a high heat resistance and solvent resistance, and a composite membrane for gas separation having a high gas permeability and gas separation ability as well as high resistance to organic vapor were provided. By the present invention, treatment of waste water containing a polar solvent at a high concentration, which hitherto could not be carried out, was first attained. Thus, the composite membrane of the present invention can be used for the separation or purification of organic solvents, for the treatment of waste liquids in the field of food industry, polymer industry and petroleum chemical industry, as well as for the recovery of the organic vapor dissipated in the air, to which the conventional composite membrane cannot be applied. Thus, the composite membrane of the present invention will greatly contribute to the separation processes utilizing membranes.

BEST MODE FOR CARRYING OUT THE INVENTION

In the composite membrane of the present invention, the porous membrane is a layer which does not substantially have a separation ability, which is for reinforcing the active layer having the separation ability. The porous membrane may have uniform fine pores or may have fine pores of which diameters are gradually enlarged from one side of the membrane to the other side of the membrane, the pore diameters at the side with smaller diameters being preferably not more than 100 nm.

In the present invention, the porous membrane contains as the major constituent the polyphenylenesulfide sulfone of the formula (I) described above, which is excellent in heat resistance and solvent resistance. In the above-described formula (I), n represents a natural number. Although the number is not restricted, if the molecular weight is too large, it is difficult to dissolve the polymer in a solvent. On the other hand, if the molecular weight is too small, the mechanical strength of the membrane is low. Thus, the molecular weight of the polyphenylenesulfide sulfone is preferably several tens thousand to about 100,000.

Although the porous membrane in the present invention may preferably be made of the polyphenylenesulfide sulfone represented by the formula (I) alone, as long as the properties of the membrane are not adversely affected, a unit other than the above-described phenylenesulfide sulfone unit may be contained in the polymer or a polymer other than the above-mentioned polyphenylenesulfide sulfone may be blended in the polymer.

The porous membrane employed in the present invention may be in any form such as flat membrane, hollow fibers or tube. The flat membrane may be used in the form of spiral type, plate type or frame type, and tubes and the hollow fibers may be used in bundled form so as to constitute an element.

The thickness of the flat porous membrane may preferably be 10 $\mu$m to 300 $\mu$m in view of pressure resistance, and more preferably 30 $\mu$m to 100 $\mu$m in view of the permeation resistance of liquid and gas.

In cases where the porous membrane is in the form of a flat membrane, the membrane may be laminated on a fabric or a non-woven fabric so that the membrane is reinforced. In this case, the fabric or the non-woven fabric may preferably be made from a polymer such as polyester, polyamide, polyethylene, polypropylene or polyphenylenesulfide.

The polyphenylenesulfide sulfone polymer represented by formula (I) may be prepared by a known process as described in, for example, Japanese laid-open patent application (Kokai) No. 63-270736. That is, the polyphenylenesulfide sulfone may be prepared by polymerizing bis(4-chlorophenyl)sulfone and sodium hydrogen sulfide in N-methylpyrrolidone solvent under heat.

The porous membrane employed in the present invention may be prepared by dissolving the above-described phenylenesulfide sulfone polymer in a solvent, pouring the solution into a mold, and casting the molded solution into a non-solvent of the polyphenylenesulfide sulfone to coagulate the molded solution, which non-solvent is miscible with the solvent in which the polyphenylenesulfide sulfone is dissolved. It should be noted, however, the process of producing the porous membrane is not restricted to the wet process since a process of making the polymer porous after melt-molding of the polymer or a process in which the porous membrane is molded from dispersed polymer may also be employed.

Preferred solvents for dissolving the polymer include aprotic solvents, acids and phenol compounds, although the solvents are not restricted thereto. Examples of the preferred solvents include dimethylsulfoxide (DMSO), N-methylpyrrolidone (NMP), N,N-dimethyl-2-imidazolidinone (DMI), hexamethylphosphoric triamide (HMPA), sulfuric acid, dichloroacetic acid, p-chlorophenol, m-cresol and the like since these solvents well dissolve the polymer.

As a characteristic common to these solvents, the solubility parameters ($\delta$) of these solvents are about 11. The $\delta h$ more largely contributes to the solubility of the copolymer than $\delta d$ and $\delta p$ (wherein $\delta h$, $\delta d$ and $\delta p$ represent hydrogen bond force, dispersion force and polarity force components, respectively).

In addition to the above-described solvents, for example, $\epsilon$-caprolactam, $\gamma$-butyrolactone, sulforan, diphenylsulfide, diphenylamine, $\delta$-valerolactam, dimethylformamide (DMF) and tetramethylurea may be employed, although not restricted.

The solvent may also be a mixed solvent. That is, a mixture of two or more of the above-described solvents or a mixture of the above-described solvent and a solvent other than mentioned above may be employed. For example, in the case where NMP is used as the solvent, not only the aprotic polar solvents but also halogenated hydrocarbons, ketones, organic acids and amino compounds may be added to the solvent. By the addition of these solvents, the solubility of the polymer may be promoted and the change in the structure of the membrane or the separation efficiency due to the change in the g value (coagulation value) may be controlled.

To control the pore size of the membrane, an inorganic salt, acid, non-solvent of the copolymer and/or a macromolecular compound may be added to the phenylenesulfide-based polymer solution. As the inorganic salt, those which are well dissolved in the aprotic solvent are preferred, of which examples include sodium chloride, sodium bromide, lithium chloride, sodium iodide, potassium thiocyanate, potassium iodide, potassium chloride, iodine, lead acetate, lead chloride, lead nitrite and potassium permanganate. Preferred examples of the acid include acetic acid, trimeritic acid, lactic acid, propionic acid, valeric acid, citric acid, benzoic acid, sulfuric acid and dichloroacetic acid. Preferred examples of the macromolecular compound include polyvinyl alcohol, polyethylene glycol and polyvinylpyrrolidone. The amount of these additives may usually be, although not restricted, 0.1–40% by weight. As the amount of these additives are increased, the pore size of the membrane is enlarged.

The dissolving of the polymer is usually carried out at a temperature not higher than the boiling point of the solvent. In cases where the solubility of the polymer is extremely low, a pressure may be applied to the solvent so as to elevate its boiling point, and the polymer may be dissolved in the solvent under a temperature not higher than the elevated boiling point.

To remove contaminants, it is preferred to filter the obtained polymer solution. Although it is preferred to conduct the filtration using a membrane filter, in cases where the viscosity of the solution is high, a cotton filter may be employed, or the filtration may be carried out at a high temperature. The resulting filtrate is hereinafter referred to as "casting solution".

Although the concentration of the casting solution may be selected arbitrarily within the range of the solubility of the copolymer in the solvent, if the concentration is too low, the formed membrane structure is weak, and if the concentration is too high, the solution is hard to permeate. In general, if the concentration is high, a membrane with high solute rejection and low permeation is obtained. Usually, the concentration of the polymer in the casting solution may preferably be 10–30% by weight. In case of flat membranes, as a concentration giving an appropriate viscosity for obtaining practical membrane properties, a concentration of 15–25% by weight is preferred. Since the hollow fiber is not supported by a substrate, the concentration of the casting solution may preferably be higher than that employed in the preparation of flat membranes. That is, 18–30% by weight is usually preferred. In view of the retention of the shape of the hollow fiber during the spinning step and of the separation performance, a viscosity of not less than 0.5 poise is preferred.

In case of preparing a flat membrane, the casting solution is cast on a substrate in a prescribed thickness. In case of preparing a hollow fiber, the casting solution is extruded from a double spinneret and the spun fiber is introduced into a non-solvent of the polymer, which is miscible with the solvent of the casting solution. In case of preparing a flat membrane, the thickness of the casting solution may preferably be, although not restricted to, 30–600 μm because good membrane performance may be obtained.

The hollow fiber may be prepared by extruding the polymer solution from a double spinneret while spurting out a gas or a liquid from the inner spinneret so as to form a hollow fiber structure, and introducing the obtained fiber into a coagulating liquid. The separation performance of the membrane may be controlled by controlling the temperature at the spinneret, temperature of the coagulating liquid, composition of the liquid to be spurted out, the time from the extrusion to the coagulation and/or the draft value.

The temperature of the casting solution, the time from the casting to the coagulation, the temperature and humidity of the environment from the casting to the coagulation, and the temperature of the coagulating liquid influence the separation performance of the membrane. In many cases, if the temperatures are low, membranes with high solute rejections and low permeabilities are obtained.

The coagulation liquid is a liquid which is freely miscible with the solvent of the casting solution and a non-solvent of the polymer, and may be a single substance or a mixture of liquids. To control the coagulation speed of the casting solution, an inorganic salt and/or an organic compound may be added to the casting solution. Preferred examples of the inorganic salt may include sodium chloride, sodium bromide, lithium chloride, sodium iodide, potassium thiocyanate, potassium iodide, potassium chloride, iodine, lead acetate, lead chloride, lead nitrite and potassium permanganate. Preferred examples of the organic compound may include methanol, ethanol, isopropanol, butanol, polyethylene glycol, polyvinylpyrrolidone, polyvinyl alcohol, N-methylpyrrolidone, N,N-dimethylimidazolidone, dimethylformamide, dimethylsulfoxide and hexamethylphosphoric triamide. In cases where it is desired to slow down the coagulation speed, a good solvent of the copolymer may be added to the coagulation liquid. The concentration of these additives is not restricted and is usually 1–30% by weight.

In cases where an aprotic polar solvent and an acid are used as the casting solution, the coagulation liquid may preferably be selected, although not restricted, from water, methanol, ethanol, isopropanol and butanol.

The temperature of the coagulation liquid is an important factor like the composition of the coagulation liquid for controlling the separation performance of the membrane. Usually, the temperature of the coagulation liquid may preferably be 0°–50° C.

By oxidizing the thus obtained porous membrane so as to convert a part of the sulfide bonds into sulfone bonds, the heat resistance, chemical resistance and hydrophilicity of the membrane are further promoted. The oxidation may be carried out by using an oxidizing agent. Preferred examples of the oxidizing agent include, although they are not restricted to, hydrogen peroxide, organic peroxide (e.g., peracetic acid, perbutyric acid, perbenzoic acid, chloroperbenzoic acid and the like), alkali metals, alkaline earth metals, quaternary ammonium hypochlorite, chlorine, chromic acid, alkali metal permanganates and nitric acid. Since the oxidation reaction is a solid-liquid heterogeneous reaction, the oxidizing agent per se and/or the solvent thereof may preferably be one which can swell the polymer without changing the microstructure of the membrane much. From this viewpoint, organic peroxides and/or quaternary ammonium hypochlorite dissolved in an organic solvent are especially preferred. Particularly, although not restricted, peracetic acid, chloroperbenzoic acid, and tetrabutylammonium hypochlorite solution in ethyl acetate are especially preferred for efficiently promoting the durability of the polymer. The oxidation may be carried out by immersing the porous membrane in a solution of the oxidizing agent. Although the temperature of the solution of the oxidizing agent is not restricted, usually 0°–50° C. is preferred. To carry out the reaction efficiently, the reaction may be conducted at a temperature higher than room temperature. In this case, however, care should be taken for not causing explosion if a peroxide is used. In cases where the reaction topically proceeds severely, it is desired to cool the reaction mixture at a temperature lower than room temperature. Although the time of the oxidation treatment is appropriately selected depending on the concentration of the oxidizing agent and the reaction temperature, it is usually 10 minutes to 5 hours. After the oxidation treatment, the porous membrane may be washed with water and/or alcohol to obtain an oxidized porous membrane. Although the oxidation treatment may be performed either before or after the preparation of the composite membrane by forming an active layer on the polyphenylenesulfide sulfone porous membrane, since the active layer may be adversely affected by the oxidation treatment, it is preferred to perform the oxidation treatment before forming the active layer.

Although a material such as polysulfone or polyimide which is known to have high heat resistance may be blended in the polyphenylenesulfide sulfone, since the polyphenylenesulfide sulfone has better heat resistance and processability, it is preferred not to blend other polymers.

In the present invention, the active layer is made of a polymer having separation ability by pervaporation, or a polymer having gas separation ability, or a polymer having reverse osmosis property.

Representative examples of the polymers having separation ability by pervaporation include polydimethylsiloxane, polymethylsilyl propine-1, polyvinyl chloride, polyvinylidene chloride, polyfluorovinyl, polyfluorovinylidene, butadiene-acrylonitrile copolymers, cellulose, cellulose acetate, carboxymethyl cellulose, chitosan, salts of chitosan, alginic acid, alginates, polyacrylic acid, polyacrylate, polyion complexes of polyacrylic acid, cross-linked polyacrylic acid, polyvinyl alcohol, cross-linked polyvinyl alcohol, polyvinyl alcohol/polystyrene sulfonic acid mixture and cross-linked aromatic polyamides. Among these, polydimethylsiloxane, polytrimethylsilyl propine-1, chitosan, alginic acid and polyvinyl alcohol are especially preferred.

The active layer of the composite membrane for pervaporation may be formed by dissolving the polymer which will constitute the active layer in a solvent such as an organic solvent or water, applying the obtained solution on the porous membrane and by removing the solvent by drying or the like. Any method may be selected for the application of the solution on the porous membrane as long as the solution can cover the surface of the porous membrane uniformly and continuously. Thus, conventional application methods such as coating the solution on the surface of the porous membrane and immersing the porous membrane in the solution may be employed. With the present invention, the porous membrane is stable to all of the solvents including those for the above-mentioned polymers. Thus, solvents which are known to damage the substrate made of polysulfone or the like of conventional composite membranes for pervaporation may be employed as the solvent for the polymer of the active layer constituting the active layer.

The thickness of the composite membrane for pervaporation may preferably be 0.01–10 $\mu$m, more preferably 0.05–5.0 $\mu$m. If the thickness is smaller than 0.01 $\mu$m, it is difficult to obtain a uniform active layer and defects are likely to be formed. On the other hand, if the thickness is larger than 10 $\mu$m, the permeation rate is decreased. The thickness of the active layer may be controlled by controlling the concentration of the polymer solution for forming the active layer.

Representative examples of the organic liquid mixtures which can be separated by the pervaporation method utilizing the composite membrane of the present invention include water/alcohol mixtures such as water/ethanol and water/isopropyl alcohol mixtures; water/carboxylic acid mixtures such as water/acetic acid mixture; water/ketone mixtures such as water/acetone mixture; water/aprotic polar solvent mixtures such as water/dimethylformamide and water/N-methyl-2-pyrrolidone mixtures; ester/alcohol mixtures such as methyl acetate and the like/methanol and the like mixtures; aromatic hydrocarbon/alcohol mixtures such as benzene or the like/methanol or the like mixtures; alcohol/aprotic polar solvent mixtures such as methanol or the like/dimethylformamide or N-methyl-2-pyrrolidone or the like mixtures.

Representative examples of the polymers having gas separation ability include silicone-based polymers such as cross-linked silicones and silicone/silphenylene copolymers; vinyl polymers such as polyethylene, poly(4-methylpentene-1) and polybutadiene; polysulfones; polyimides and cellulose acetate, although not restricted thereto. Among these, especially preferred are polydimethylsiloxane, polyolefins and polyimides. The thinner the active layer, the larger the gas permeation rate, which is preferred. However, the gas separation ability may be adversely affected by thinning the active layer. Thus, the thickness of the active layer should be so selected as thin as possible within the permissible range in which the active layer has a prescribed gas separation ability.

The active layer of the composite membrane for gas separation may be formed by dissolving a polymer constituting the active layer in a good solvent, coating the resulting solution on the porous membrane and drying the solution; or by dissolving a polymer for constituting the active layer in a good solvent thereof, spreading the resulting solution on water surface so as to form a solid thin film and then laminating the thus formed thin film on the porous membrane. However, the method of forming the active layer is not restricted to these methods.

The active layer having reverse osmosis property may be formed, for example, of a cross-linked polyamide prepared by interfacial polycondensation. The method for forming the active layer made of the cross-linked polyamide by the interfacial polycondensation is well-known as a method for producing the conventional composite reverse osmosis membranes. That is, the active layer may be formed by interfacially polycondensing a multifunctional amine and a multifunctional acid halide.

As the multifunctional amine compound, amine compounds with di- or more valence may be employed. Representative amine compounds include m-phenylenediamine, 1,3,5-triaminobenzene, piperazine, polyethyleneimine, ethylenediamine and the like. As the multifunctional acid halide, for example, acid halides of 1,3,5-benzenetricarboxylic acid, terephthalic acid, isophthalic acid, 1,3,5-cyclohexanetricarboxylic acid, cyclohexanedicarboxylic acid, adamantane tetracarboxylic acid and furandicarboxylic acid may be employed.

Although the cross-linked polyamide constituting the active layer is not restricted, in view of the separation characteristics and permeation characteristics, cross-linked aromatic polyamides and cross-linked piperazine polyamides are preferred.

The active layer of the composite reverse osmosis membrane may be formed by applying an aqueous solution containing the multifunctional amine on the substrate membrane, and then applying thereon a solution containing the multifunctional acid halide in an organic solvent which is immiscible with water so as to carry out the interfacial polycondensation reaction.

The optimum concentration of the amino compound in the aqueous multifunctional amine solution varies depending on the compound, it is usually 0.1–10% by weight, preferably 0.5–5.0% by weight. The aqueous solution may contain a surfactant, organic solvent, antioxidant and the like as long as they do not hinder the reaction.

The application of the aqueous amine solution on the surface of the porous substrate may be conducted by any appropriate method as long as the surface of the microporous substrate is covered with the aqueous amine solution uniformly and continuously. For example, the aqueous solution may be coated on the surface of the porous membrane or the porous membrane may be immersed in the aqueous solution.

The aqueous amine solution applied in excess is removed in a liquid-removing step. The excess solution may be removed by, for example, vertically holding the membrane so that the excess solution naturally drops from the membrane. It is preferable not to leave a drop on the membrane. The membrane may be dried after the excess solution is removed, although this is not necessary.

Then the organic solution of the above-described polyfunctional acid halide in the organic solution is applied to the membrane to form the ultra-thin membrane containing cross-linked polyamide as the major component by the interfacial polycondensation.

The concentration of the polyfunctional acid halide in the organic solution may preferably be 0.01–10% by weight, more preferably 0.02–2% by weight. In some cases, it is preferred that the organic solution contain an acylation catalyst such as DMF since the interfacial polycondensation is enhanced.

The organic solvent is required to be immiscible with water, to dissolve the acid halide and not to destroy the porous membrane. Any organic solvent satisfying these requirements, which is inert to the amino compound and to the acid halide, may be employed. Preferred examples of the organic solvent include hydrocarbons, trichlorotrifluoroethane and the like. In view of the reaction rate and the volatility of the solvent, n-hexane and trichlorotrifluoroethane are preferred, and in view of the inflammability of the solvent, trichlorotrifluoroethane is most preferred.

The polyfunctional acid halide may be contacted with the aqueous phase of the amino compound in the same manner as the application of the aqueous amino compound solution on the porous membrane.

The thus prepared composite membrane exhibits satisfactory performance as it is. However, by immersing the thus prepared composite membrane in an aqueous solution containing chlorine with a pH of 6–13, the performance of the membrane, especially the salt rejection and the water flux may be improved. Examples of the chlorine-generating reagent include chlorine gas, bleaching powder, sodium hypochlorite, chlorine dioxide, Chloramine B, Chloramine T, Halazone, dichlorodimethylhydantoin, and isocyanuric acid chloride as well as salts thereof. The concentration thereof may preferably be determined based on the oxidation power thereof. Among the above-mentioned chlorine-generating reagents, aqueous sodium hypochlorite solution is most preferred in view of the ease of handling. There is an important relationship between the oxidation power and pH of the chlorine-containing aqueous solution. For example, in case of aqueous sodium hypochlorite solution, if the pH is less than 6, the solution does not have a sufficient oxidation power and if the pH is more than 13, the amide bond may be hydrolyzed.

EXAMPLES

The present invention will now be described by way of examples thereof. However, the present invention is not restricted to the examples.

REFERENCE EXAMPLE 1

The aqueous peracetic acid solution used herein was prepared by adding 22.8 ml of 30 wt % aqueous hydrogen peroxide solution and 1.6 ml of concentrate sulfuric acid to 75.6 ml of acetic acid and leaving the resulting mixture to stand at room temperature (20°–25° C.) for one day.

REFERENCE EXAMPLE 2

Twenty grams of polyphenylenesulfide sulfone (weight average molecular weight: 31,600) having repeating units represented by the formula $-(-Ph-S-)(-Ph-SO_2-)-$ was added to 80 g of N-methyl-2-pyrrolidone and the resulting mixture was heated at 180° C. for 1 hour to dissolve the polyphenylenesulfide sulfone. The obtained solution was cooled to 50° C., and insoluble materials were removed by filtration through a polytetrafluoroethylene membrane filter with a pore size of 10 μm to obtain a solution for film-forming. The solution for film-forming (temperature: 50° C.) was cast on a glass plate to a thickness of 150 μm and then the glass plate was immediately immersed in pure water at 25° C., followed by leaving the glass plate to stand in the pure water for 5 minutes to obtain porous poly(phenylenesulfide sulfone) substrate. The thus obtained porous membrane was immersed in the peracetic acid prepared in Reference Example 1 for 3 hours at room temperature (25° C.).

Analysis of the thus obtained porous membrane by IR and NMR revealed that the polymer constituting the porous membrane contained 90 mol % of a repeating unit of the formula $-(-Ph-SO_2-)(-Ph-SO_2-)-$ and 10 mol % of a repeating unit of the formula $-(-Ph-S-)(-Ph-SO_2-)-$.

EXAMPLE 1

The same procedure as in Reference Example 2 was repeated except that a taffeta made of polyester fibers (both the warps and wefts consisted of multifilament yarn of 150 deniers, weaving density: 90 warps/inch, 67 wefts/inch, thickness: 160 μm) was fixed on the glass plate and the solution for film-forming was cast on the taffeta, to obtain a fiber-reinforced porous membrane.

In 198 g of pure water, 1.0 g of chitosan having a deacetylation ratio of 95% and 1.0 g of acetic acid were dissolved to obtain a coating solution containing 0.5% by weigh of chitosan acetate.

The fiber-reinforced porous membrane fixed on the glass plate was horizontally held and the coating solution containing chitosan acetate was coated on the surface of the porous membrane. The glass plate was then vertically held to remove the excess coating solution and the resultant was dried in a hot air drier at 50° C. for 8 minutes while holding the glass plate vertically.

The thickness of the active layer made of chitosan acetate calculated from the amount of the attached coating solution was 0.4 μm.

The thus obtained fiber-reinforced composite membrane was removed from the glass plate and was immersed in 1% by weight of sulfuric acid (solvent: ethanol/water (50/50 w/w)) for 2 minutes at room temperature (25° C.) so as to convert the chitosan acetate to chitosan sulfate.

The fiber-reinforced composite membrane having an active layer made of chitosan sulfate was examined for its pervaporation performance using ethanol/water (95/5 w/w) mixture at 60° C. as the supplied liquid and reducing the pressure of the secondary side to 5 mmHg.

With this composite membrane, water preferentially permeated. The separation coefficient α was 60 and the permeation rate Q was 0.80 kg/m$^2$.hr.

COMPARATIVE EXAMPLE 1

The same taffeta as used in Example 1 was fixed on a glass plate and 15 wt % polysulfone (Udel-P3500 commercially available from Union Carbide) solution in dimethylformamide was cast thereon to a thickness of 150 μm. The glass plate was immediately immersed in pure water at 25° C. and was left to stand for 5 minutes to obtain a fiber-reinforced porous polysulfone substrate.

Using the thus obtained porous polysulfone substrate, a fiber-reinforced composite membrane having an active layer made of chitosan sulfate was prepared in the same manner as in Example 1. The thickness of the active layer calculated as in Example was 0.4 μm. The pervaporation performance of the composite membrane was tested as in Example 1. As a result, the supplied liquid permeated as it is and so no separation was observed.

EXAMPLE 2

Using the composite membrane prepared in Example 1, the pervaporation performance was examined in the same manner as in Example 1 except that dimethylformamide/water (95/5 w/w) mixture at 60° C. was used as the supplied liquid. As a result, water preferentially permeated, and the separation coefficient α was 20 and the permeation rate Q was 0.35 kg/m$^2$.hr.

COMPARATIVE EXAMPLE 2

The pervaporation performance of the composite membrane prepared in Comparative Example 1 was tested as in Example 1. As a result, the supplied liquid permeated as it is and no separation was observed. After the test, it was found that the porous polysulfone substrate had disappeared. Thus, it is assumed that the porous membrane was dissolved by the dimethylformamide/water (95/5 w/w) mixed liquid or mixed gas.

COMPARATIVE EXAMPLE 3

The same taffeta as used in Example 1 was fixed on a glass plate and 20 wt % acrylonitrile/methyl acrylate copolymer (95/5 mol/mol, weight average molecular weight: 120,000) solution in dimethylsulfoxide was cast thereon to a thickness of 150 μm. The glass plate was immediately immersed in pure water at 25° C. and was left to stand for 5 minutes to obtain a fiber-reinforced porous polyacrylonitrile substrate. Using the thus obtained porous substrate, a fiber-reinforced composite membrane having an active layer made of chitosan sulfate was prepared in the same manner as in Example 1. The thickness of the active layer calculated as in Example was 0.5 μm. The pervaporation performance of the composite membrane was tested as in Example 2. As a result, the supplied liquid permeated as it is and so no separation was observed. After the test, it was found that the porous polyacrylonitrile-based substrate had disappeared. Thus, it is assumed that the porous membrane was dissolved by the dimethylformamide/water (95/5 w/w) mixed liquid or mixed gas.

EXAMPLE 3

In 198 g of cyclohexane, 2 g of polytrimethylsilylpropine-1 was dissolved to obtain a coating solution for forming the active layer. The fiber-reinforced porous membrane prepared in Example 1 was fixed on a glass plate. While horizontally holding the glass plate, the coating solution was coated thereon such that the surface of the porous membrane is completely wetted. The glass plate was then vertically held to remove the excess coating solution and the resultant was dried in a hot air drier at 80° C. for 5 minutes while vertically holding the glass plate. The thickness of the active layer calculated as in Example was 4.0 μm.

The pervaporation performance of the thus obtained composite membrane was examined in the same manner as in Example 1 except that dimethylformamide/methanol (95/5 w/w) mixture at 60° C. was used as the supplied liquid. As a result, water preferentially permeated, and the separation coefficient α was 100 and the permeation rate Q was 0.20 kg/m$^2$.hr.

COMPARATIVE EXAMPLE 4

Using the fiber-reinforced porous polyacrylonitrile-based substrate prepared in Comparative Example 2, a composite membrane having an active layer made of polytrimethylsilylpropine-1 as in Example 3 was prepared. The thus obtained composite membrane was tested for its pervaporation performance as in Example 3. As a result, the supplied liquid permeates as it is and no separation of the mixture was observed. The thickness of the active layer calculated as in Example 1 was 0.4 μm. After the measurement, the porous polyacrylonitrile-based substrate had disappeared as in Comparative Example 3.

EXAMPLE 4

Poly(phenylenesulfide sulfone)(PPSS) was synthesized by the following process: That is, to an autoclave of about 1 liter equipped with a thermometer, pressure gauge, stirrer, and an external heater, 154.7 g of bis-(4-chlorophenyl)sulfone, 56.5 g of sodium carbonate, 43.7 g of sodium acetate, 50.7 g of sodium hydrogen sulfide (in the form of 59.0 wt % aqueous solution), 21.7 g of N-methyl-2-pyrrolidone (NMP) and 14.4 g of deionized water were supplied. The mixture was heated from 25° C. to 200° C. under stirring and was stirred for 3 hours at 200° C.

A mixture of 160 ml of NMP and 26.7 ml of deionized water was then added to the autoclave. Stirring was continued until the temperature of the mixture raised to about 150° C. The reaction mixture in the form of solid granules was removed from the reaction vessel and the liquid was aspirated. The solid substance was washed with hot deionized water (about 90° C., about 600 ml), filtered and rinsed once on the filter. These steps were repeated twice and the mixture was finally rinsed with cold deionized water so as to remove water-soluble impurities.

To a one liter autoclave, 40 g of the thus purified and recovered polymer, 400 g of deionized water and 4.0 g of zinc acetate [Zn(C$_2$H$_3$O$_2$.2H$_2$O] were supplied. The autoclave was then equipped with a stirrer, heater/cooler, thermometer and pressure gauge. The mixture of polymer/aqueous zinc acetate solution was heated to 185° C. under stirring and the mixture was kept at this temperature for another one hour under stirring. The mixture was then cooled to room temperature and the recovered polymer was once washed with hot water (about 90° C., about 400 ml) under stirring. The recovered polymer was dried at 160° C. under reduced pressure. The weight average molecular weight of the polymer was 31,600. Infrared absorption spectrum analysis revealed that the polymer had the chemical structure of the formula

This polymer is hereinafter referred to as polyphenylenesulfide sulfone (PPSS) for short.

To 85 g of dry N-methylpyrrolidone, 15 g of the thus obtained PPSS was added. After the atmosphere of the vessel containing this mixture was changed to nitrogen, the mixture was heated to 180° C. to dissolve the polymer. Insoluble materials were removed by filtering the mixture through a polytetrafluoroethylene membrane filter with a pore size of 1 μm. The thus obtained solution was cast onto a glass plate to an average thickness of 150 μm at room temperature (20° C.) and the glass plate was then immediately immersed in water (25° C.) to obtain a porous membrane. Amino-modified silicone (SF8417, commercially available from Toray Silicone Inc.) was dissolved in Freon R113 to a concentration of 1% by weight and tolylenediisocyanate was dissolved therein to a concentration of 0.2% by weight to obtain a polymer solution for active layer. The water attached to the surface of the porous membrane obtained above was blown off by an air knife and the solution was coated thereon to a thickness of 50 μm, followed by drying the coated solution by hot air at 100° C. The thus obtained composite membrane was further dried at 50° C. for 1 hour and the oxygen permeation rate and the nitrogen permeation rate thereof were measured. The measured gas permeability and gas separation performance are shown in Table 1.

As can be seen from Table 1, the composite membrane of the present invention is excellent in gas permeability and gas separation ability and has a high resistance to organic vapor.

EXAMPLE 5

Peracetic acid solution was prepared by adding 22.8 ml of 30% aqueous hydrogen peroxide solution and 1.6 ml of concentrate sulfuric acid to 75.6 ml of acetic acid and leaving to stand the resulting mixture for one day.

The porous membrane obtained in Example 1 was immersed in peracetic acid solution for 3 hours and then washed with water. The thus treated porous membrane was coated with the amino-modified silicone/tolylenediisocyanate/Freon R113 mixture used in Example 4 with a thickness of 50 μm and the solution was dried by hot air at 100° C. After drying the membrane for another one hour at 50° C., 0.5 wt % solution of poly(4-methyl-pentene-1) (MX001 commercially available from Mitsui Petrochemical Industries, Ltd.) in cyclohexane was coated on the silicone layer to a thickness of 10 μm and the solution was dried by hot air at 100° C. The gas permeability of the thus obtained composite membrane is shown in Table 1. The gas permeability of this composite membrane after holding the membrane in an atmosphere of saturated trichloroethane vapor at 50° C. is shown in Table 1.

As can be seen from Table 1, the organic vapor resistance of the composite membrane is excellent.

COMPARATIVE EXAMPLE 5

Twenty percent by weight of polysulfone (UDEL P-1700 commercially available from Union Carbide) solution in dimethylformamide was prepared and was cast on a glass plate, followed by immersion of the glass plate in water coagulation bath to obtain a porous membrane.

On the thus obtained porous membrane, the amino-modified silicone coating solution used in Example 5 was coated to a thickness of 50 μm and the solution was dried, followed by additional drying at 50° C. for one hour. The gas permeability of the obtained composite membrane is shown in Table 1. The composite membrane was held in saturated toluene vapor atmosphere at 50° C. for 24 hours. As a result, the composite membrane was broken by toluene vapor.

Examples of the composite membranes for reverse osmosis will now be described. The performance of the composite membranes was evaluated based on the salt rejection and water flux measured by ordinary methods using 1500 ppm of NaCl at 15 atm., 25° C.

EXAMPLE 6

On a polyphenylenesulfide non-woven fabric with a thickness of 100 μm, 16 wt % polyphenylenesulfide sulfone solution in dimethylimidazolidinone (DMI) was applied to a thickness of 70 μm at room temperature. The fabric was then immersed in distilled water at room temperature so as to coagulate the solution, thereby obtaining a polyphenylenesulfide sulfone porous substrate reinforced with polyphenylenesulfide non-woven fabric.

The thus obtained membrane had a rejection ratio against polyethylene glycol with a molecular weight of 100,000 of about 90% and water flux of about 2 $m^3/m^2$.day (1 atm, 25° C., 1000 ppm aqueous polyethylene glycol solution).

The obtained porous membrane was immersed in an aqueous solution containing 1% by weight of m-phenylenediamine and 1% by weight of 1,3,5-triaminobenzene for 3 minutes. After removing the excess aqueous solution, a solution containing 0.05% by weight of terephthalic acid chloride and 0.05% by weight of trimesic acid chloride in trifluorotrichloroethane was applied on the membrane to form an ultra-thin membrane of cross-linked aromatic polyamide.

The thus obtained composite membrane had a salt rejection of about 99% and a water flux of about 1 $m^3/m^2$.day.

EXAMPLE 7

The same procedure as in Example 6 was repeated except that the polyphenylenesulfide sulfone porous substrate membrane oxidized by peracetic acid solution was used. The obtained composite membrane had a salt rejection of about 98% and a water flux of about 1 $m^3/m^2$.day.

EXAMPLE 8

The composite membranes prepared in Example 1 and 2 were immersed in a suspension of water/trichloroethylene for one day and the suspension was then replaced with water. The performance of the composite membranes of Example 1 and 2 hardly changed.

COMPARATIVE EXAMPLE 6

The same procedure as in Example 6 was repeated except that the polysulfone porous substrate membrane was used. The obtained composite membrane had a salt rejection of about 99% and a water flux of about 1 $m^3/m^2$.day. The composite membrane was immersed in the suspension used in Example 8 for one day, and then the suspension was replaced with water. As a result, the polysulfone porous substrate membrane was broken and the membrane did not retain the form of a composite membrane.

TABLE 1

| | Initial Performance | | Performance After Retaining in Saturated Toluene or Trichloroethane Vapor at 50° C. for 24 Hours | |
|---|---|---|---|---|
| | $QO_2$ | $\alpha(=QO_2/QN_2)$ | $QO_2$ | $\alpha(=QO_2/QN_2)$ |
| Example 4 | 6 | 2.1 | 5.8 | 2.1 |
| Example 5 | 2 | 3.0 | 1.9 | 3.0 |
| Comparative Example | 6 | 2.1 | Could Not Be Determined Since the Membrance Was Broken | |

$QO_2$: Oxygen Permeation Rate (m$^3$/m$^2$ · hr · atm)
$QN_2$: Nitrogen Permeation Rate (m$^3$/m$^2$ · hr · atm)
$\alpha$: Oxygen/Nitrogen Separation

INDUSTRIAL AVAILABILITY

The composite membrane of the present invention has excellent separation ability, permeability, organic solvent resistance and heat resistance, and can be used as a membrane for pervaporation, as a composite semi-permeable membrane and as a gas separation membrane. The composite membrane of the present invention makes it possible to treat waste water containing a polar solvent at a high concentration, which was hitherto cannot be carried out. When used as an pervaporation membrane, the composite membrane of the present invention makes it possible to dehydrate a wide variety of organic solvents, and when used as a gas separation membrane, the composite membrane makes it possible to separate and recover vapor of organic solvents. Thus, the composite membrane of the present invention can be used for the separation or purification of organic solvents, for the treatment of waste liquids in the field of food industry, polymer industry and petroleum chemical industry, as well as for the recovery of the organic vapor dissipated in the air, to which the conventional composite membrane cannot be applied. Thus, the composite membrane of the present invention will greatly contribute to the separation processes utilizing membranes.

We claim:

1. A composite membrane comprising a porous membrane including as a major constituent a polymer having a repeating unit represented by the formula (I)

  (I)

(wherein Ph represents phenyl group, n represents a natural number) and an active layer formed on said porous membrane.

2. The composite membrane of claim 1, wherein said active layer is made of a material having pervaporation separation property.

3. The composition membrane of claim 2, wherein said material having pervaporation separation property is selected from the group consisting of polydimethylsiloxane, polytrimethylsilylpropine-1, chitosan, alginic acid and polyvinyl alcohol.

4. The composite membrane of claim 1, wherein said active layer is made of a material having reverse osmotic property.

5. The composite membrane of claim 4, wherein said material having reverse osmotic property is a cross-linked polyamide prepared by interfacial polycondensation.

6. The composite membrane of claim 5, wherein said cross-linked polyamide comprises as a major constituent a cross-linked aromatic polyamide or a cross-linked piperazine polyamide.

7. The composite membrane of claim 1, wherein said active layer is made of a material having gas separation property.

8. The composite membrane of claim 7, wherein said material having gas separation property is selected from the group consisting of polydimethylsiloxane, polyolefins and polyimides.

9. The composite membrane of claim 1, wherein the composite membrane is in the form of a flat membrane, and wherein the composite membrane further comprises a fabric or a non-woven fabric on which said composite membrane is laminated, which fabric or non-woven fabric being made of a polymer selected from the group consisting of polyesters, polyamides, polyethylene, polypropylene and polyphenylenesulfide.

10. A composite membrane comprising a porous membrane prepared by oxidizing a porous membrane including as a major constituent a polymer having a repeating unit represented by the formula (I)

  (I)

(wherein Ph represents a phenyl group and n represents a natural number) and an active layer formed on said porous membrane.

11. The composite membrane of claim 10, wherein the oxidation of the porous membrane is carried out by immersing the porous membrane in an oxidizer selected from the group consisting of peracetic acid, chloroperbenzoic acid and tetrabutylammonium hypochlorite.

* * * * *